(12) United States Patent
Kumar et al.

(10) Patent No.: US 11,637,008 B1
(45) Date of Patent: Apr. 25, 2023

(54) CONICAL POCKET LASER-SUSTAINED PLASMA LAMP

(71) Applicant: KLA Corporation, Milpitas, CA (US)

(72) Inventors: Sumeet Kumar, San Jose, CA (US); Joshua Wittenberg, Fremont, CA (US); Mark S. Wang, San Ramon, CA (US); Rajkeshar Singh, Milpitas, CA (US); Yoshio Kagebayashi, Milpitas, CA (US); Shinichiro Nozaki, Milpitas, CA (US)

(73) Assignees: KLA CORPORATION, Milpitas, CA (US); USHIO, INC., Tokyo (JP)

( * ) Notice: Subject to any disclaimer, the term of this patent is extended or adjusted under 35 U.S.C. 154(b) by 0 days.

(21) Appl. No.: 17/890,813

(22) Filed: Aug. 18, 2022

Related U.S. Application Data

(60) Provisional application No. 63/344,412, filed on May 20, 2022.

(51) Int. Cl.
| | |
|---|---|
| *H01H 1/24* | (2006.01) |
| *H01J 65/04* | (2006.01) |
| *H01J 61/02* | (2006.01) |
| *G01N 21/21* | (2006.01) |

(52) U.S. Cl.
CPC .......... *H01J 65/04* (2013.01); *G01N 21/211* (2013.01); *H01J 61/025* (2013.01); *G01N 2021/213* (2013.01)

(58) Field of Classification Search
CPC ......... H05H 1/24; H05H 1/3478; H01J 65/04; H01J 61/025; G01N 21/211; G01N 2021/213
See application file for complete search history.

(56) References Cited

U.S. PATENT DOCUMENTS

| | | | |
|---|---|---|---|
| 5,608,526 | A | 3/1997 | Piwonka-Corle et al. |
| 5,999,310 | A | 12/1999 | Shafer et al. |
| 6,297,880 | B1 | 10/2001 | Rosencwaig et al. |
| 7,345,825 | B2 | 3/2008 | Chuang et al. |
| 7,525,649 | B1 | 4/2009 | Leong et al. |
| 7,957,066 | B2 | 6/2011 | Armstrong et al. |
| 9,228,943 | B2 | 1/2016 | Wang et al. |
| 2013/0106275 | A1* | 5/2013 | Chimmalgi ........... H01J 61/526 313/112 |

FOREIGN PATENT DOCUMENTS

| | | |
|---|---|---|
| JP | 2015130314 A | 7/2015 |
| JP | 2017224629 A | 12/2017 |

* cited by examiner

*Primary Examiner* — Anne M Hines
(74) *Attorney, Agent, or Firm* — Suiter Swantz pc llo (57) ABSTRACT

A plasma lamp for use in a broadband plasma source of an inspection tool is disclosed. The plasma lamp includes a plasma bulb configured to contain a gas and generate a plasma within the plasma bulb. The plasma bulb is formed from a material at least partially transparent to illumination from a pump laser and at least a portion of broadband radiation emitted by the plasma. The plasma bulb includes a conical pocket. The conical pocket is configured to disrupt a plume rising from the plasma.

18 Claims, 12 Drawing Sheets

CONICAL POCKET LASER-SUSTAINED PLASMA LAMP

CROSS-REFERENCE TO RELATED APPLICATION

The present application claims the benefit under 35 U.S.C. § 119(e) of U.S. Provisional Application Ser. No. 63/344,412, filed May 20, 2022, entitled TAPERED POCKET LASER-SUSTAINED PLASMA LAMP, which is incorporated herein by reference in the entirety.

TECHNICAL FIELD

The present disclosure relates generally to broadband plasma lamps and, more particularly, to broadband plasma lamp equipped with a plasma bulb having a conical pocket for controlling the convective environment within the plasma bulb.

BACKGROUND

As the demand for integrated circuits having ever-small device features continues to increase, the need for improved illumination sources used for inspection of these ever-devices continues to grow. One such illumination source includes a laser-sustained broadband plasma (BBP) source, which is capable of producing high-power broadband light. Laser-sustained BBP light sources operate by focusing laser radiation into a gas volume contained within a gas containment vessel to excite the gas, such as argon or xenon, into a plasma state, which in turn emits broadband light.

A plume originating from the hot plasma in a BBP light source has temperatures of thousands of degrees centigrade. The lower density hot plume rises upwards through the gas, accelerates, and impinges upon the internal surfaces of the lamp. Typically, the hot plume rises to directly impinge upon the upper surface of the discharge chamber of the lamp. This plasma convective plume phenomenon creates local hot spot regions that are difficult to cool sufficiently. Plasma lamps are commonly formed from fused silica, which is a poor thermal conductor. As a result, plasma lamps formed from fused silica do not distribute heat effectively, making thermal management difficult. Therefore, it would be advantageous to provide a plasma lamp design that overcomes the shortcomings of previous approaches.

SUMMARY

A plasma lamp is disclosed. In embodiments, the plasma lamp includes a plasma bulb configured to contain a gas and generate a plasma within the plasma bulb. In embodiments, the plasma bulb is formed from a material at least partially transparent to illumination from a pump laser and at least a portion of broadband radiation emitted by the plasma. In embodiments, the plasma bulb comprises a conical pocket, wherein the conical pocket includes at least one of a converging section or a diverging conical section and is configured to disrupt a plume rising from the plasma. In embodiments, the plasma lamp is incorporated into a laser-sustained plasma (LSP) broadband light source. In embodiments, the LSP broadband light source is incorporated into a characterization system, such as, but not limited to, an inspection system or a metrology system.

A method of reducing thermal transport between a plasma and a plasma bulb in a LSP broadband light source is disclosed. In embodiments, the method includes generating pump illumination. In embodiments, the method includes directing a portion of the pump illumination into a plasma bulb to sustain a plasma within a body of the plasma bulb. In embodiments, the method includes disrupting, with a conical pocket of the plasma bulb, a portion of a plume rising from the plasma to reduce thermal transport from the plasma to one or more walls of the plasma bulb. In embodiments, the method includes collecting a portion of broadband light emitted from the plasma and directing the portion of broadband light to one or more downstream applications.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF DRAWINGS

The numerous advantages of the disclosure may be better understood by those skilled in the art by reference to the accompanying figures.

DETAILED DESCRIPTION

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to plasma lamps having a plasma bulb design suited to control the convective environment within the plasma lamps utilized within light sources of broadband plasma inspection tools. The convection control protects the walls of the discharge chamber of the plasma bulb from excessive heating by the improved convection plume of the plasma. This control is achieved by shaping the upper portion of the discharge chamber into a conical pocket shape (e.g., pocket shape having a converging and/or diverging conical section) with a wide neck to allow for the ingress of gas flow. Embodiments of the present disclosure are directed to a plasma bulb design that further spreads out the region over which the plume contacts the inner surface of the plasma bulb. For example, the conical shape of the deep pocket provides extra distance from the plasma and the wall of the plasma bulb and ensures that the flow breaks up and becomes disordered prior to contacting the bulb walls. The flow spreads out and reduces the region of contact between the plume and the bulb walls, reducing thermal transport to the walls and therefore reducing the operating temperatures of the walls.

Figure 1:
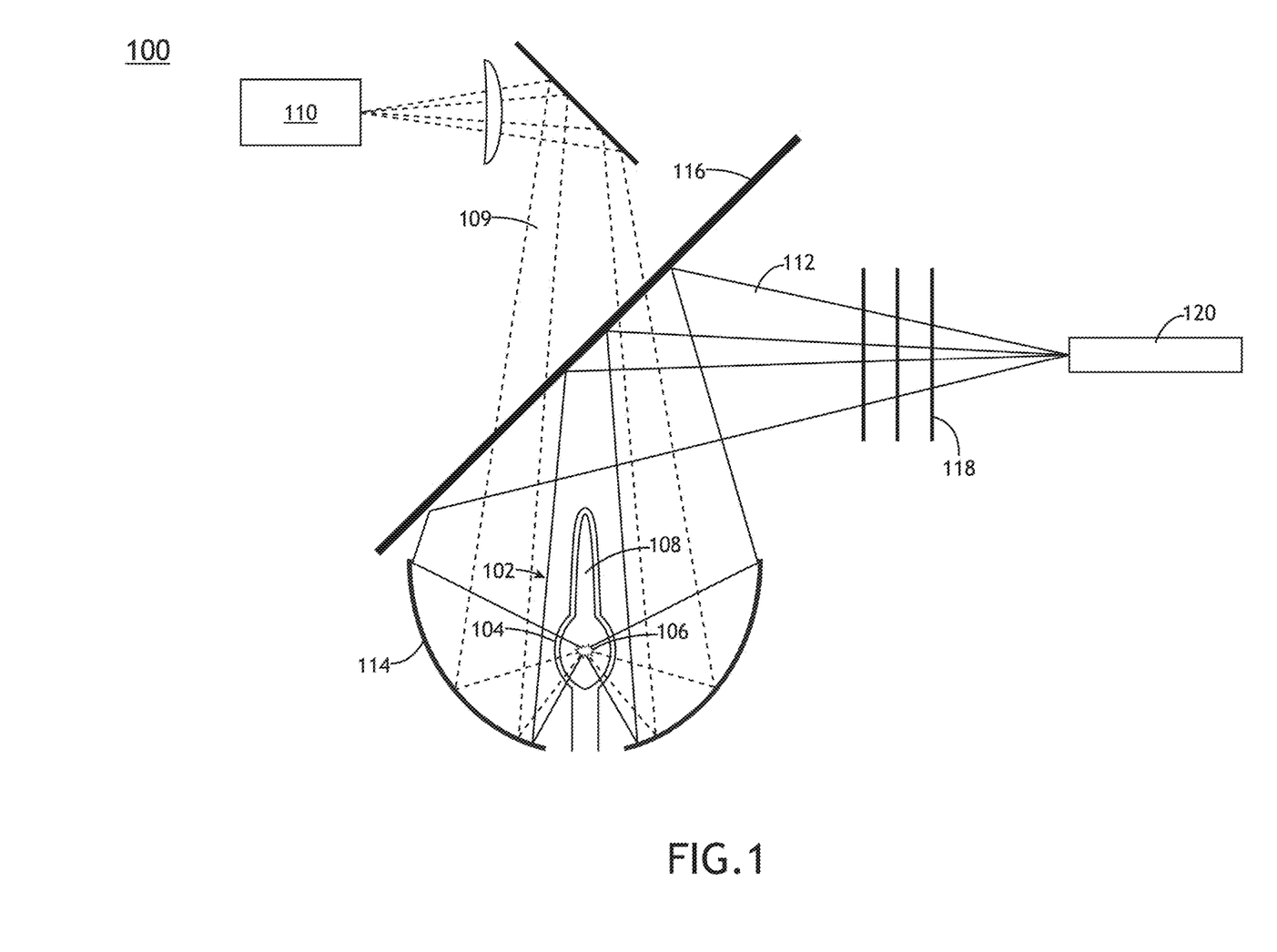
FIG. 1 illustrates a schematic view of a LSP broadband light source 100 equipped with a conical pocket plasma lamp, in accordance with one or more embodiments of the present disclosure.

FIG. 1 illustrates a schematic view of an LSP broadband light source 100, in accordance with one or more embodiments of the present disclosure. The LSP source 100 includes a plasma lamp 102. The plasma lamp 102 includes a plasma bulb 104 configured to contain a gas and generate a plasma 106 within the plasma bulb 104. In embodiments, the plasma bulb 104 includes a conical pocket 108. The conical pocket 108 is configured to disrupt a plume rising from the plasma 106. The plasma bulb 104 is formed from a material at least partially transparent to illumination 109 from a pump source 110 and the broadband radiation 112 emitted by the plasma 106.

The pump source 110 is configured to generate illumination 109, which acts as an optical pump, for sustaining the plasma 106 within the plasma bulb 104. For example, the pump source 110 may emit a beam of laser illumination suitable for pumping the plasma 106. In embodiments, the light collector element 114 is configured to direct a portion of the optical pump 109 to a gas contained in the plasma bulb 104 to ignite and/or sustain the plasma 106. The pump source 110 may include any pump source known in the art suitable for igniting and/or sustaining plasma. For example, the pump source 110 may include one or more lasers (e.g., pump lasers). The pump beam may include radiation of any wavelength or wavelength range known in the art including, but not limited to, visible, IR radiation, NIR radiation, and/or UV radiation. The light collector element 114 (e.g., ellipsoidal mirror) is configured to collect a portion of broadband radiation 112 emitted from the plasma 106. The broadband radiation 112 emitted from the plasma 106 may be collected via one or more additional optics (e.g., a cold mirror 116) for use in one or more downstream applications (e.g., inspection, metrology, or lithography). The LSP light source 100 may include any number of additional optical elements such as, but not limited to, a filter 118 or a homogenizer 120 for conditioning the broadband radiation 112 prior to the one or more downstream applications. The light collector element 114 may collect one or more of visible, NUV, UV, DUV, and/or VUV radiation emitted by plasma 106 and direct the broadband light 112 to one or more downstream optical elements. For example, the light collector element 114 may deliver infrared, visible, NUV, UV, DUV, and/or VUV radiation to downstream optical elements of any optical characterization system known in the art, such as, but not limited to, an inspection tool, a metrology tool, or a lithography tool. In this regard, the broadband light 112 may be coupled to the illumination optics of an inspection tool, metrology tool, or lithography tool.

FIGS. 2A-2D illustrate a series of conical pocket designs for use in the plasma bulb 104 of the plasma lamp 102, in accordance with one or more embodiments of the present disclosure. As shown in FIGS. 2A-2D, the conical pocket of the present disclosure may be formed by a converging conical section or the combination of a converging conical section with a diverging conical section to provide for the disruption of the plume rising from the plasma.

Figure 2A:
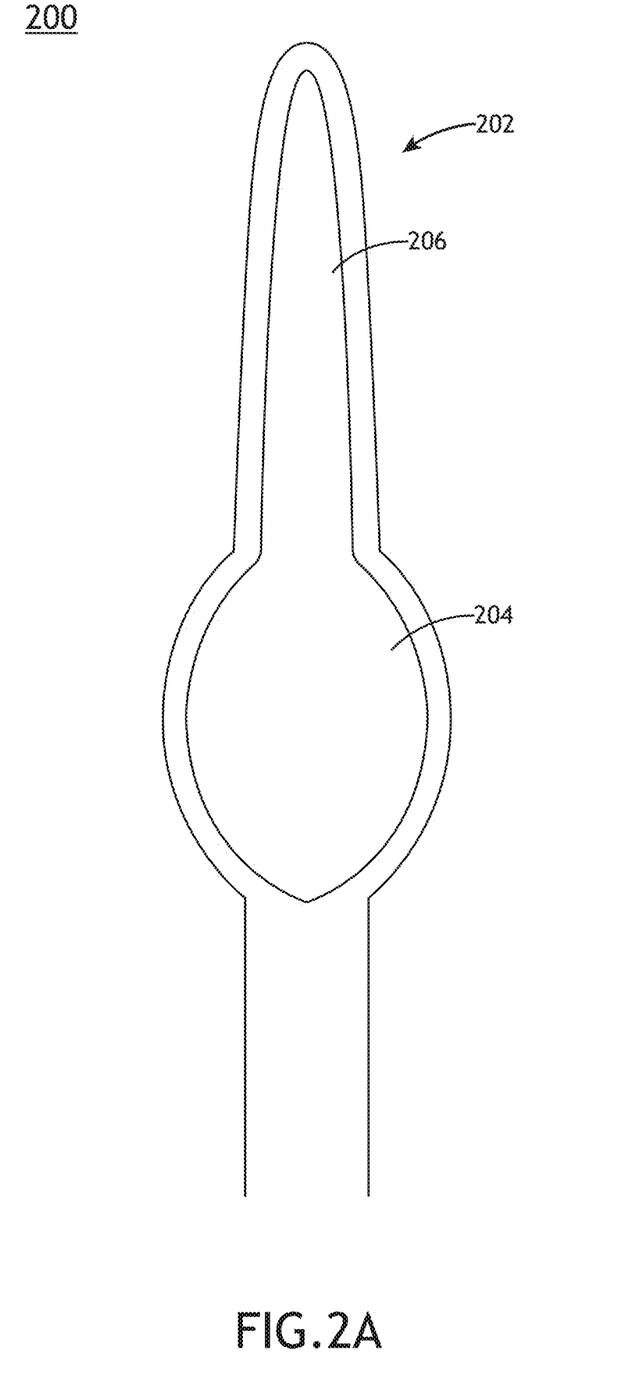
FIGS. 2A-2D illustrates a series of simplified schematic views of plasma bulbs with conical pockets, in accordance with one or more embodiments of the present disclosure.
Figure 2B:
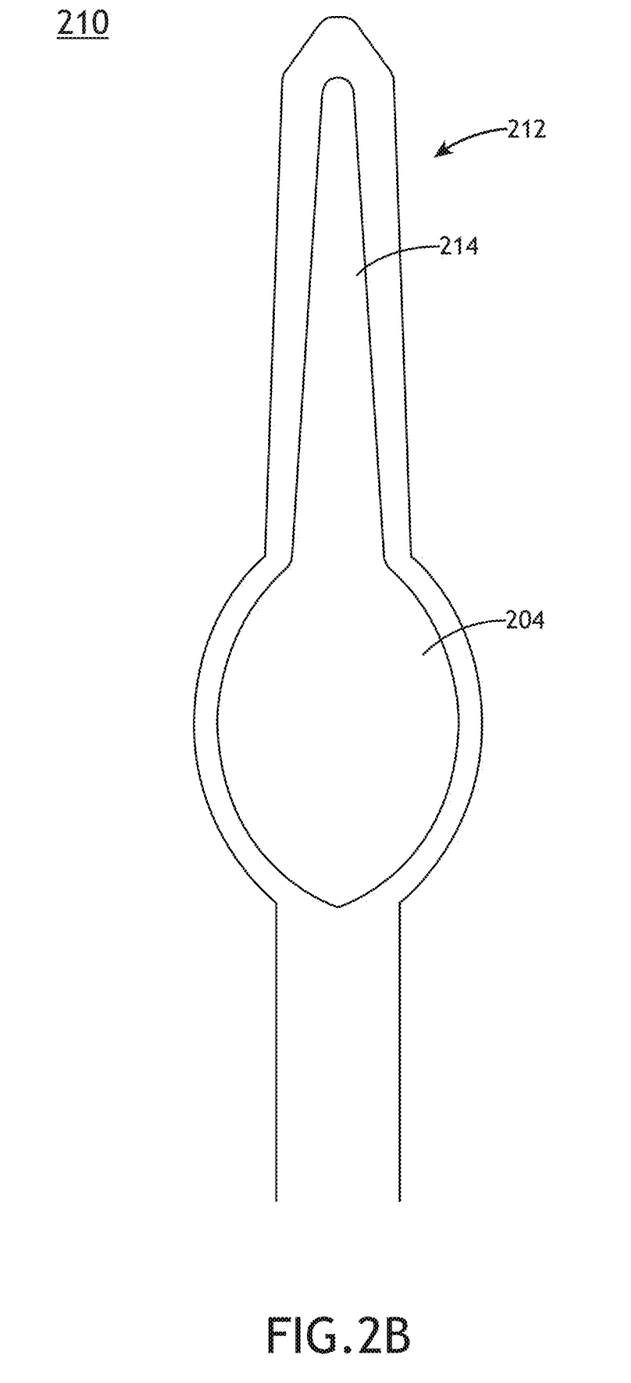
Figure 2C:
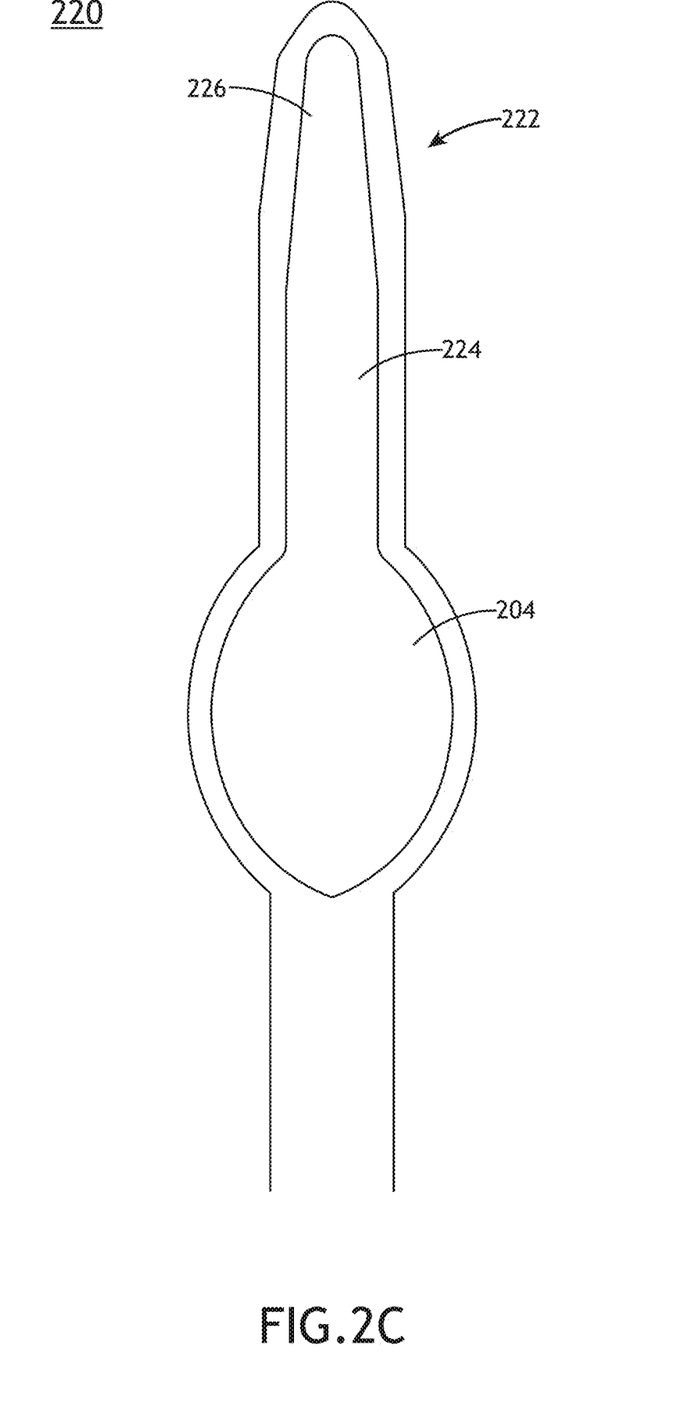
Figure 2D:
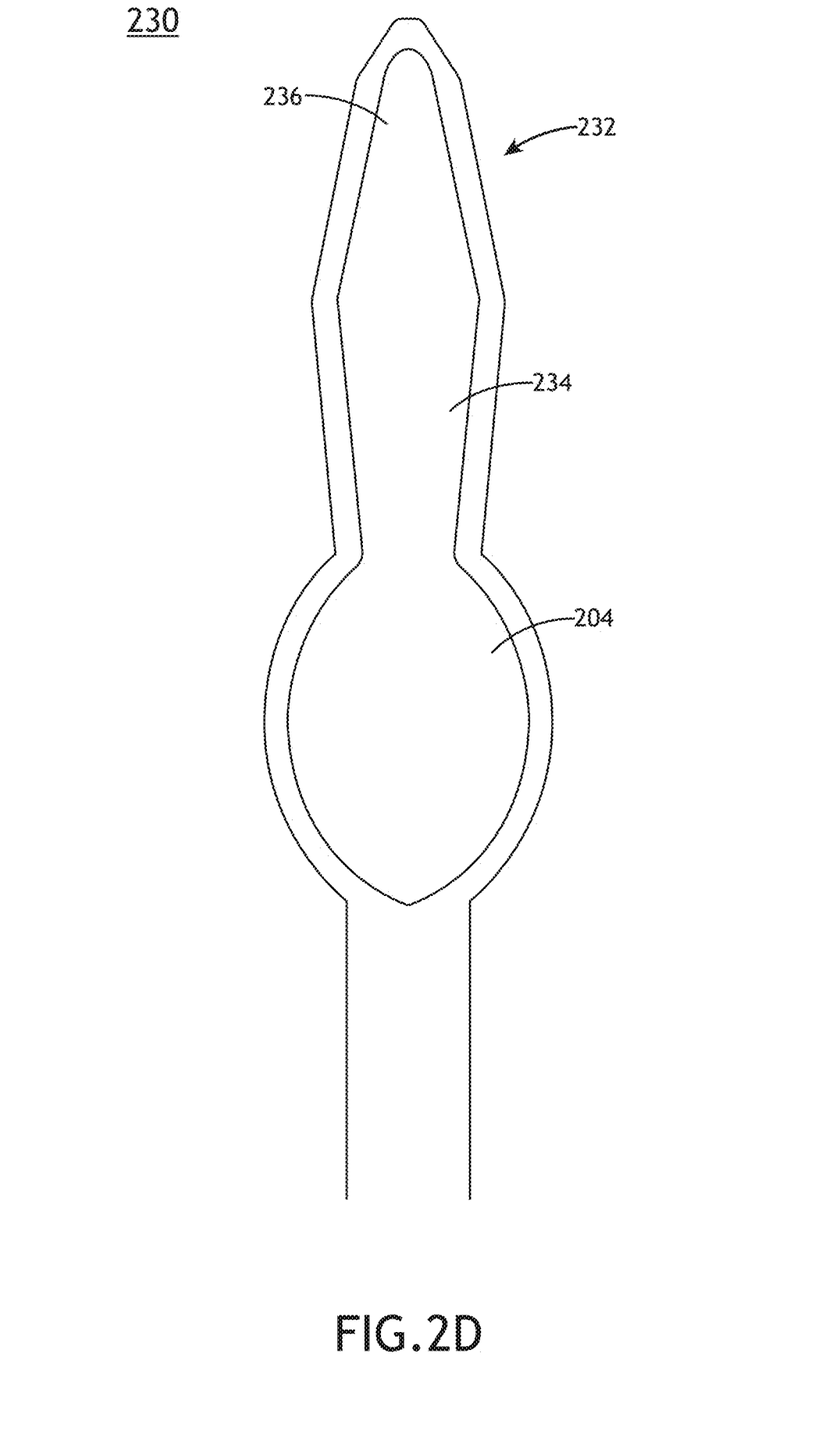
Figure 2E:
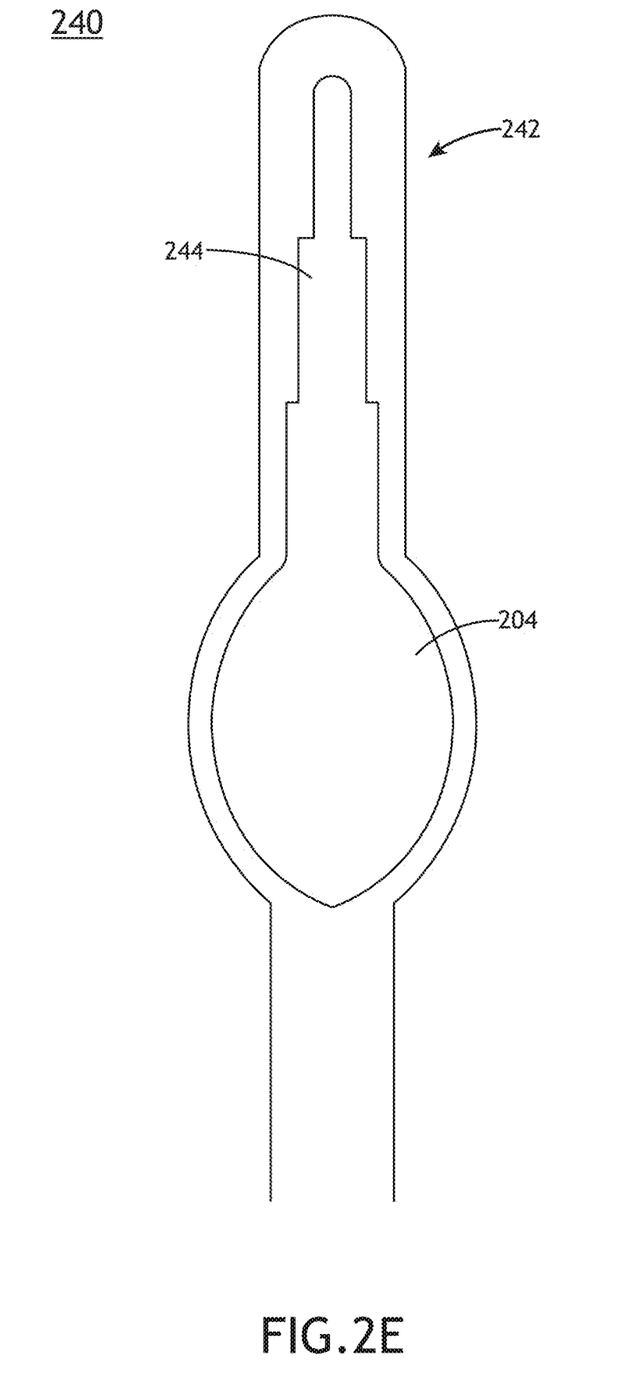
FIG. 2E illustrates a simplified schematic view of a plasma bulb with a multi-step tapered pocket, in accordance with one or more embodiments of the present disclosure

FIG. 2A illustrates a conical-pocket plasma bulb 200 having a conical pocket 202. The conical-pocket plasma bulb 200 also includes a body 204. For example, the body 204 may include an ellipsoidal section. In embodiments, the conical pocket 202 is integrated with the body 204 to disrupt the plume rising from the plasma prior to impingement of the plasma onto a top portion of the plasma bulb 200. In this embodiment, the conical pocket 202 includes a conical section 206 having a non-uniform shape (e.g., the diameter across the pocket varies as a function of vertical position). It is noted that the shape of the plasma bulb is not strictly limited to a conical shape. Rather, the shape, as shown in FIG. 2A, may slightly deviate from a perfect conical section and include inward and/or outward curvature as desired. In an alternative embodiment, as shown in FIG. 2B, the conical-pocket bulb 210 may include a conical pocket 212 and the wall 214 of the portion of the plasma bulb 210 forming the conical pocket 212 may have a non-uniform thickness (e.g., thickness of wall varies as a function of vertical position). In an alternative embodiment, as shown in FIG. 2C, the conical-pocket bulb 220 may include a conical pocket 222 formed from a straight section 224 integrated with a narrowing conical section 226 (e.g., converging conical section). In an alternative embodiment, as shown in FIG. 2D, the conical-pocket bulb 230 may include a conical pocket 232 formed from a widening conical section 234 (e.g., a diverging conical section) integrated with a narrowing conical section 236 (e.g., a converging conical section). In an alternative embodiment, as shown in FIG. 2E, the bulb may include a multi-step tapered-pocket 240 and include a tapered pocket 242 formed from a series of steps 244. The steps 244 may be formed from a series of straight sections with each successive section having a smaller diameter than the section below it.

Figure 3:
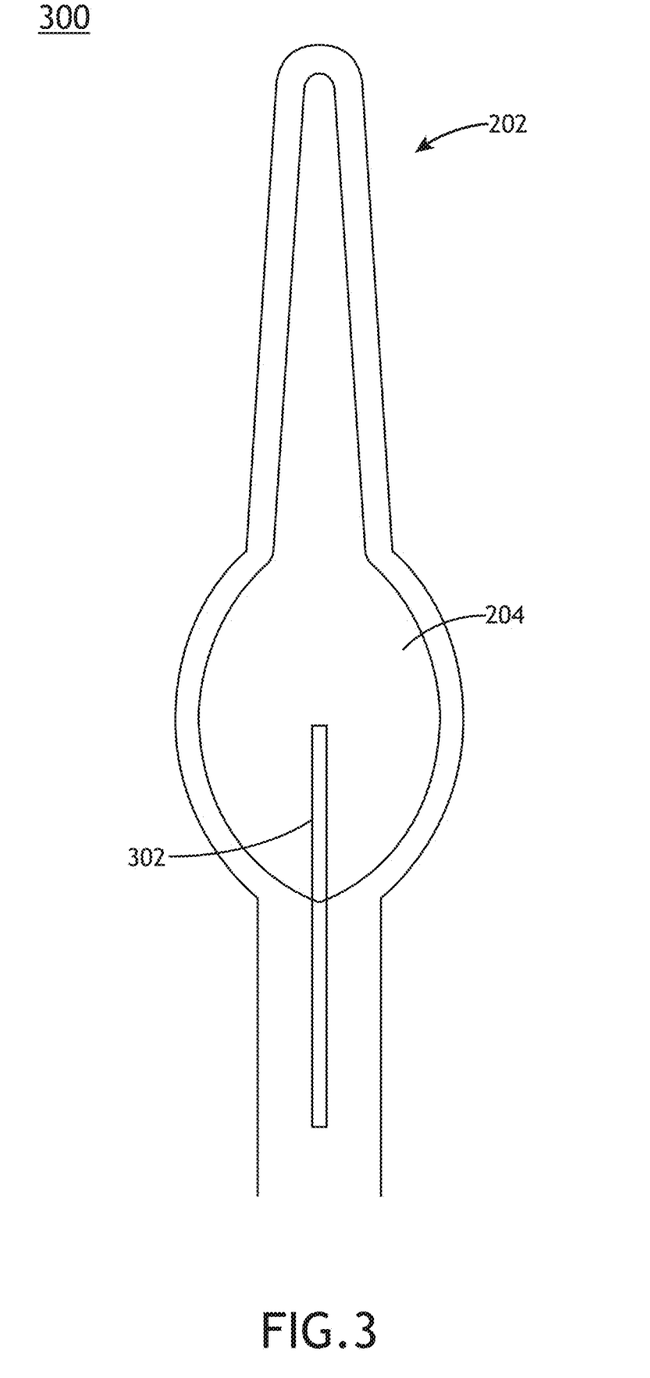
FIG. 3 illustrates a simplified schematic view of a plasma bulb with one or more electrodes, in accordance with one or more embodiments of the present disclosure.

The plasma bulbs 200-240 are shown without electrodes. It should be noted that this depiction should not be interpreted as a limitation on the scope of the present disclosure. Rather, in embodiments, each of the plasma bulbs 200-240 may be fabricated with or without electrodes. FIG. 3 illustrates a conical-pocket plasma bulb 300 including an electrode 302, in accordance with one or more embodiments of the present disclosure. In embodiments, the conical-pocket plasma bulb 300 may include one electrode or multiple electrodes (e.g., top and bottom electrodes). The one or more electrodes may comprise a metal rod.

Referring generally to FIGS. 2A-3, the transmitting portion of the plasma bulbs 102, 200, 210, 220, 230, 240, and 300 may be formed from any material known in the art that is at least partially transparent to the broadband light 112 generated by plasma 106 and/or the pump light 109. In embodiments, one or more transmitting portions of the plasma bulbs may be formed from any material known in the art that is at least partially transparent to VUV radiation, DUV radiation, UV radiation, NUV radiation and/or visible light generated within the plasma bulb 104. Further, one or more transmitting portions of the plasma bulbs may be formed from any material known in the art that is at least partially transparent to IR radiation, visible light and/or UV light from the pump source 110. In embodiments, one or more transmitting portions of the plasma bulb may be formed from any material known in the art transparent to both radiation from the pump source 110 (e.g., IR source) and radiation (e.g., VUV, DUV, UV, NUV radiation and/or visible light) emitted by the plasma 106. For example, one or more of the plasma bulbs described herein may be formed from fused silica glass.

The plasma bulbs may contain any selected gas (e.g., argon, xenon, mercury or the like) known in the art suitable for generating a plasma upon absorption of pump illumination. In embodiments, the focusing of pump illumination 109 from the pump source 110 into the volume of gas causes energy to be absorbed by the gas or plasma (e.g., through one or more selected absorption lines) within the gas containment structure, thereby "pumping" the gas species in order to generate and/or sustain a plasma 106. The source 100 may be utilized to initiate and/or sustain the plasma 106 in a variety of gas environments. In embodiments, the gas used to initiate and/or maintain plasma 106 may include an inert gas (e.g., noble gas or non-noble gas) or a non-inert gas (e.g., mercury). In embodiments, the gas used to initiate and/or maintain a plasma 106 may include a mixture of gases (e.g., mixture of inert gases, mixture of inert gas with non-inert gas or a mixture of non-inert gases). For example, gases suitable for implementation in source 100 may include, but are not limited to, Xe, Ar, Ne, Kr, He, $N_2$, $H_2O$, $O_2$, $H_2$, $D_2$, $F_2$, $CH_4$, $CF_6$, one or more metal halides, a halogen, Hg, Cd, Zn, Sn, Ga, Fe, Li, Na, Ar:Xe, ArHg, KrHg, XeHg, and any mixture thereof. The present disclosure should be interpreted to extend to any gas suitable for sustaining a plasma within a plasma bulb.

Figure 4A:
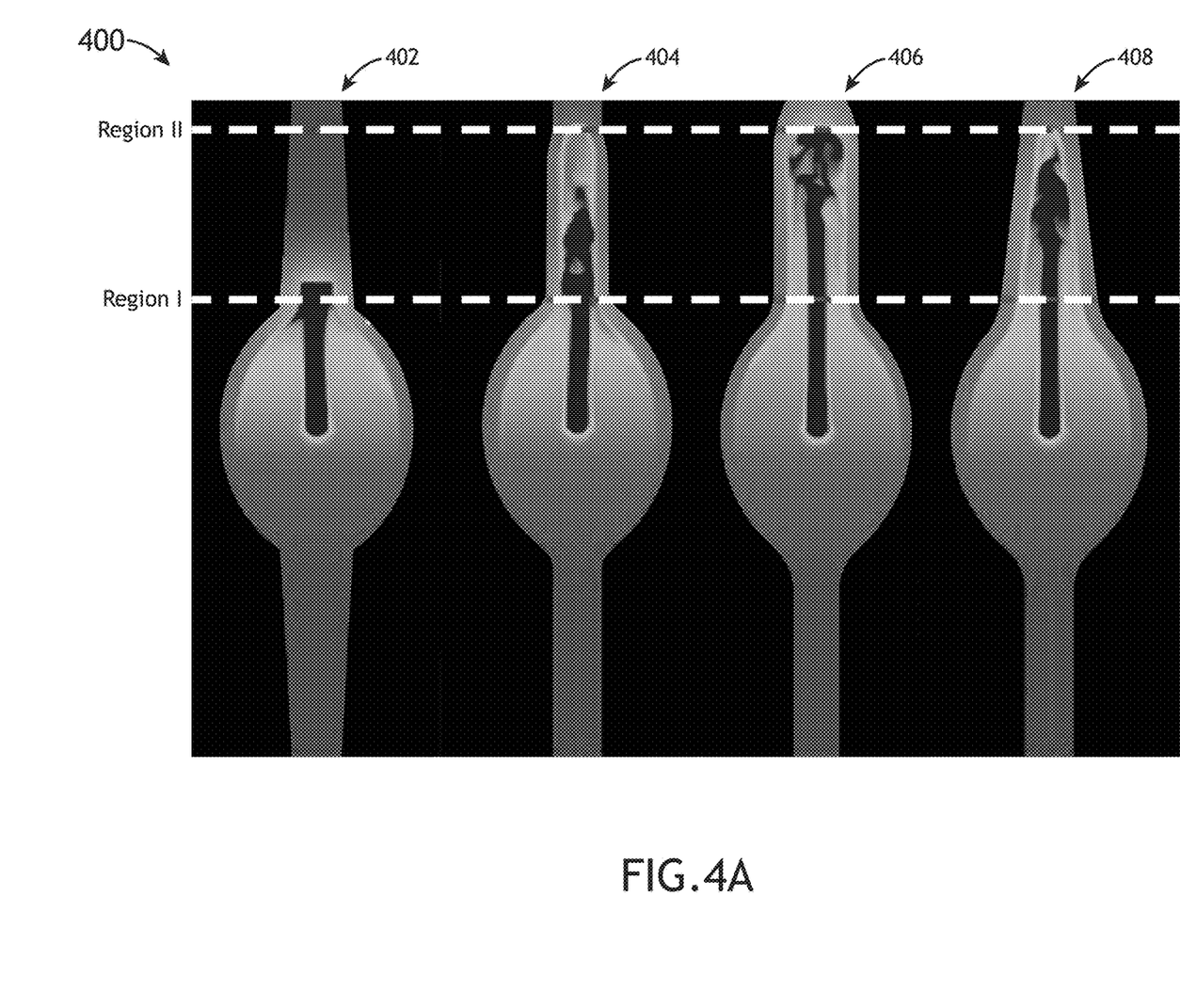
FIG. 4A illustrates a cross-section view of a variety of types of shapes for the plasma bulb of the plasma lamp, in accordance with one or more embodiments of the present disclosure.

FIG. 4A illustrates cross-section views of a variety of types of shapes for the plasma bulb of a plasma lamp, in accordance with one or more embodiments of the present disclosure. The variety of shapes depict a progression of pockets that enhance plume flow and mix and spread the thermal energy from the plasma over a larger fraction of the internal surface area of the plasma bulb. The plasma bulb 402 does not include a pocket and represents the baseline "control" plasma bulb.

Plasma bulbs 404 and 406 include cylindrical pockets with narrow and wide necks respectively. The computational fluid dynamics (CFD) simulations illustrate that the inner diameter of the "neck" of the pocket plays a significant role in the plume flow dynamics inside the pocket for a given pocket length. The narrow neck of bulb 404 disturbs the plume flow near the entrance of the pocket, thereby causing the plume to dissipate and break down. In contrast, the wide neck of 406 allows hot plume to rise unperturbed through most of the pocket length until it reaches the top of the pocket. Plasma bulb 408 includes a conical pocket with the same wide neck as plasma bulb 406. The conical shape of the pocket of plasma bulb 408 ensures plume breakdown before reaching the topmost bulb surface. The conical shape is also better streamlined for more effective cooling by forced jets from above of the plasma bulb 408.

Figure 4B:
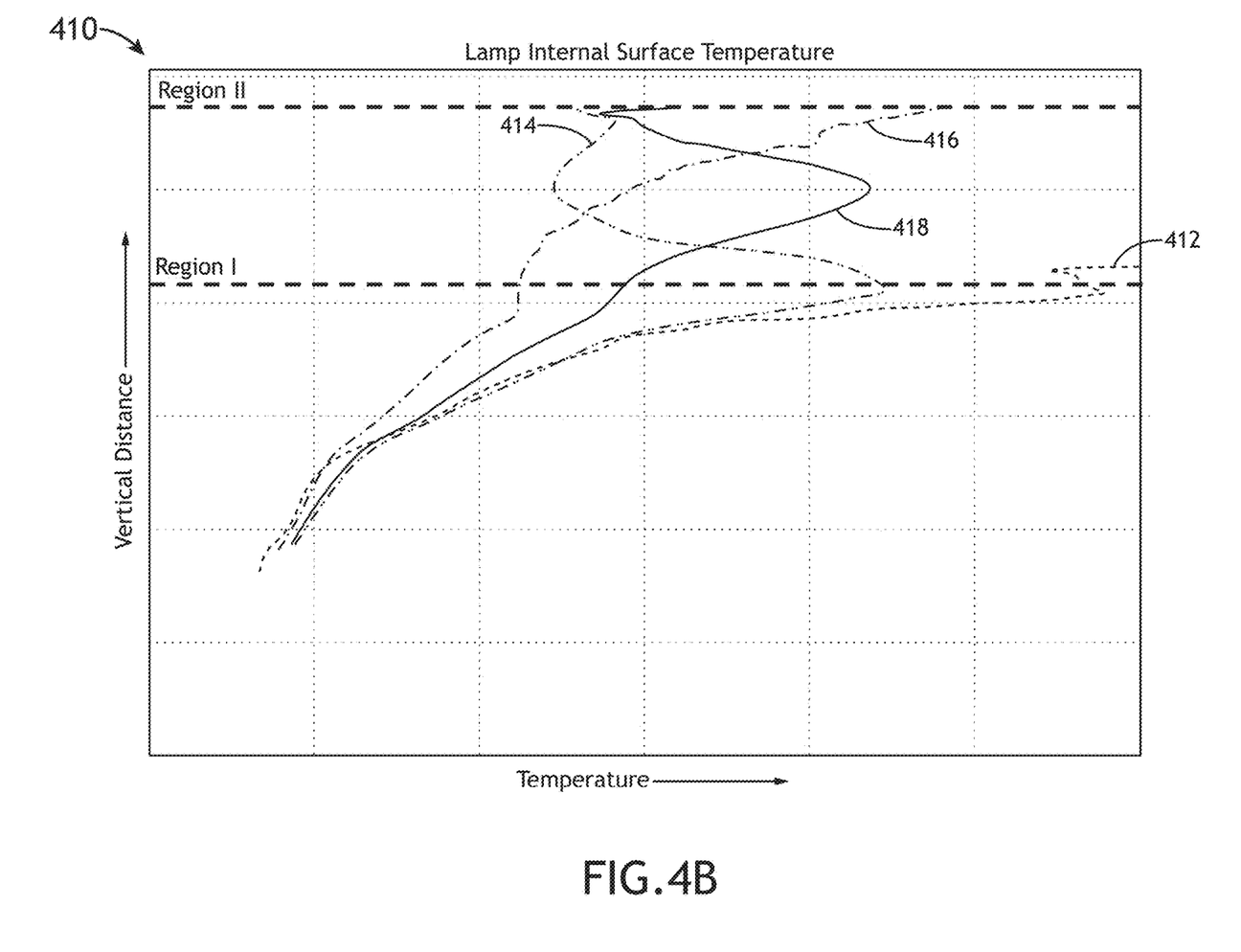
FIG. 4B illustrates a graph depicting a series of internal surface temperature curves acquired along the vertical distance of the plasma bulbs depicted in FIG. 4A, in accordance with one or more embodiments of the present disclosure.

FIG. 4B illustrates a graph 410 depicting a series of internal surface temperature curves 412-418 acquired along the vertical distance of the bulbs 402-408 respectively. It is noted that the internal temperatures of the bulbs are averaged circumferentially along the bulbs' vertical axes as a function of vertical distance. The control bulb 402, with no pocket, shows the highest internal glass temperatures as the plume impinges the top surface normally, creating a local hot spot at Region I.

Plasma bulbs with deep pockets exhibit a temperature distribution in which the hottest regions have moved upwards as a result of plume flow dynamics. In the case of plasma bulb 404, with a cylindrical pocket having a narrow neck, the plume interacts with the pocket boundary at Region I, although the magnitude of the temperature, as shown is curve 414, is far less compared to the control plasma bulb 402, as shown in curve 412. It is noted, however, that the thermal energy in the case of plasma bulb 404 is dissipated over a small surface area, making it harder to cool effectively by external forced convection. In the case of plasma bulb 406, with a wide neck, the plume travels through the pocket length but also creates a hot spot region at the topmost surface at Region II. Due to normal plume impingement at the topmost curved surface, the hot region temperature for plasma bulb 406, as shown in curve 416, is higher than plasma bulb 404, as shown in curve 414. In the case of plasma bulb 408, with the conical pocket, the wide neck enables the capture of undisturbed plume into the pocket and the conical shape breaks up and dissipates the flow below Region II, as supported by the temperature curve 418.

The conical-shaped deep pocket design of plasma bulb 408 provides the most effective convection control within the plasma bulb, reducing convective thermal transport to the bulb walls as compared to other designs, enabling the safest conditions for lamp operation. It is noted that the scope of the present disclosure is not limited to the conical-shaped plasma bulb 408 of FIG. 4A. Rather, as discussed previously herein, the conical-shaped plasma bulb 408 represents one example of a conical plasma design. It is recognized herein that the various conical designs of the present disclosure may provide the same or similar benefits as the conical-shaped design outlined previously herein.

Referring generally to FIGS. 1-4B, the pump source 110 may include any laser system known in the art capable of serving as an optical pump for sustaining a plasma. For instance, the pump source 110 may include any laser system known in the art capable of emitting radiation in the infrared, visible and/or ultraviolet portions of the electromagnetic spectrum.

In embodiments, the pump source 110 may include a laser system configured to emit continuous wave (CW) laser radiation. For example, the pump source 110 may include one or more CW infrared laser sources. In embodiments, the pump source 110 may include one or more lasers configured to provide laser light at substantially a constant power to the plasma 106. In embodiments, the pump source 110 may include one or more modulated lasers configured to provide modulated laser light to the plasma 106. In embodiments, the pump source 110 may include one or more pulsed lasers configured to provide pulsed laser light to the plasma. In embodiments, the pump source 110 may include one or more diode lasers. In embodiments, the pump source 110 may include an ion laser. In embodiments, the pump source 110 may include one or more frequency converted laser systems. In embodiments, the pump source 110 may include a disk laser. In embodiments, the pump source 110 may include a fiber laser. In embodiments, the pump source 110 may include a broadband laser. In embodiments, the pump source 110 may include one or more non-laser sources.

In embodiments, the pump source 110 may include two or more light sources. In embodiments, the pump source 110 may include two or more lasers. For example, the pump source 110 (or "sources") may include multiple diode lasers. In embodiments, each of the two or more lasers may emit laser radiation tuned to a different absorption line of the gas or plasma within source 100.

The light collector element 114 may include any light collector element known in the art of plasma production. For example, the light collector element 114 may include one or more elliptical reflectors, one or more spherical reflectors, and/or one or more parabolic reflectors. The light collector element 114 may be configured to collect any wavelength of broadband light from the plasma 106 known in the art of plasma-based broadband light sources. For example, the light collector element 114 may be configured to collect infrared, visible, UV, NUV, VUV and/or DUV light from the plasma 106.

Figure 5:
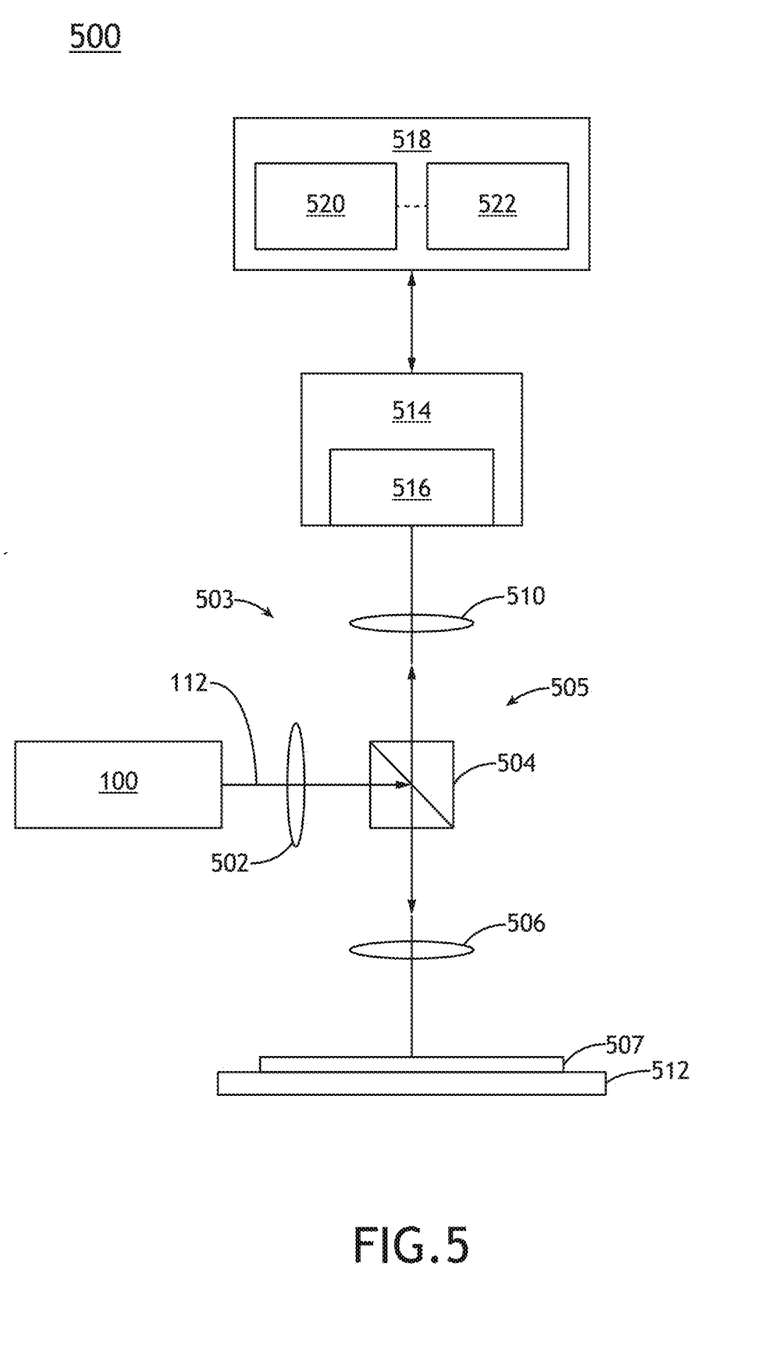
FIG. 5 is a simplified schematic illustration of an optical characterization system implementing the LSP broadband light source illustrated in any of FIGS. 1 through 4B, in accordance with one or more embodiments of the present disclosure.

FIG. 5 is a schematic illustration of an optical characterization system 500 implementing the LSP broadband light source 100 illustrated in any of FIGS. 1 through 4B (or any combination thereof), in accordance with one or more embodiments of the present disclosure.

It is noted herein that system 500 may comprise any imaging, inspection, metrology, lithography, or other characterization/fabrication system known in the art. In this regard, system 500 may be configured to perform inspection, optical metrology, lithography, and/or imaging on a sample 507. Sample 507 may include any sample known in the art including, but not limited to, a wafer, a reticle/photomask, and the like. It is noted that system 500 may incorporate one or more of the various embodiments of the LSP broadband light source 100 described throughout the present disclosure.

In embodiments, sample 507 is disposed on a stage assembly 512 to facilitate movement of sample 507. The stage assembly 512 may include any stage assembly 512 known in the art including, but not limited to, an X-Y stage, an R-8 stage, and the like. In embodiments, stage assembly 512 is capable of adjusting the height of sample 507 during inspection or imaging to maintain focus on the sample 507.

In embodiments, the set of illumination optics 503 is configured to direct illumination from the broadband light source 100 to the sample 507. The set of illumination optics 503 may include any number and type of optical components known in the art. In embodiments, the set of illumination optics 503 includes one or more optical elements such as, but not limited to, one or more lenses 502, a beam splitter 504, and an objective lens 506. In this regard, set of illumination optics 503 may be configured to focus illumination from the LSP broadband light source 100 onto the surface of the sample 507. The one or more optical elements may include any optical element or combination of optical elements known in the art including, but not limited to, one or more mirrors, one or more lenses, one or more polarizers, one or more gratings, one or more filters, one or more beam splitters, and the like.

In embodiments, the set of collection optics 505 is configured to collect light reflected, scattered, diffracted, and/or emitted from sample 507. In embodiments, the set of collection optics 505, such as, but not limited to, focusing lens 510, may direct and/or focus the light from the sample 507 to a sensor 516 of a detector assembly 514. It is noted that sensor 516 and detector assembly 514 may include any sensor and detector assembly known in the art. For example, the sensor 516 may include, but is not limited to, a charge-coupled device (CCD) detector, a complementary metal-oxide semiconductor (CMOS) detector, a time-delay integration (TDI) detector, a photomultiplier tube (PMT), an avalanche photodiode (APD), and the like. Further, sensor 516 may include, but is not limited to, a line sensor or an electron-bombarded line sensor.

In embodiments, detector assembly 514 is communicatively coupled to a controller 518 including one or more processors 520 and memory medium 522. For example, the one or more processors 520 may be communicatively coupled to memory 522, wherein the one or more processors 520 are configured to execute a set of program instructions stored on memory 522. In embodiments, the one or more processors 520 are configured to analyze the output of detector assembly 514. In embodiments, the set of program instructions are configured to cause the one or more processors 520 to analyze one or more characteristics of sample 507. In embodiments, the set of program instructions are configured to cause the one or more processors 520 to modify one or more characteristics of system 500 in order to maintain focus on the sample 507 and/or the sensor 516. For example, the one or more processors 520 may be configured to adjust the objective lens 506 or one or more optical elements 502 in order to focus illumination from LSP broadband light source 100 onto the surface of the sample 507. By way of another example, the one or more processors 520 may be configured to adjust the objective lens 506 and/or one or more optical elements 502 in order to collect illumination from the surface of the sample 507 and focus the collected illumination on the sensor 516.

It is noted that the system 500 may be configured in any optical configuration known in the art including, but not limited to, a dark-field configuration, a bright-field orientation, and the like.

Figure 6:
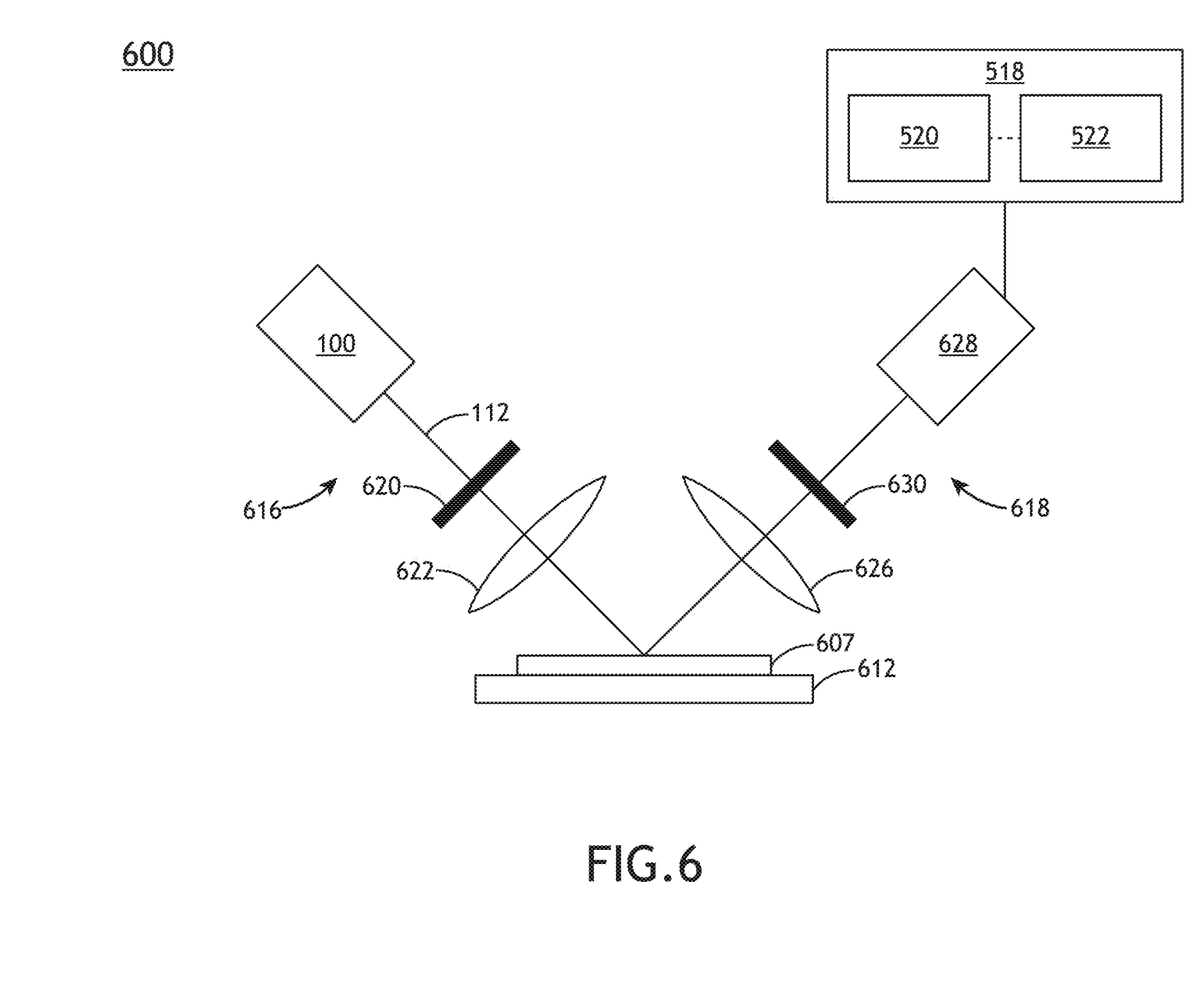
FIG. 6 is a simplified schematic illustration of an optical characterization system implementing the LSP broadband light source illustrated in any of FIGS. 1 through 4B, in accordance with one or more embodiments of the present disclosure.

FIG. 6 illustrates a simplified schematic diagram of an optical characterization system 600 arranged in a reflectometry and/or ellipsometry configuration, in accordance with one or more embodiments of the present disclosure. It is noted that the various embodiments and components described with respect to FIGS. 1 through 5 may be interpreted to extend to the system of FIG. 6 and vice-versa. The system 600 may include any type of metrology system known in the art.

In embodiments, system 600 includes the LSP broadband light source 100, a set of illumination optics 616, a set of collection optics 618, a detector assembly 628, and the controller 518.

In this embodiment, the broadband illumination from the LSP broadband light source 100 is directed to the sample 607 via the set of illumination optics 616. In embodiments, the system 600 collects illumination emanating from the sample 607 via the set of collection optics 618. The set of illumination optics 616 may include one or more beam conditioning components 620 suitable for modifying and/or conditioning the broadband beam. For example, the one or more beam conditioning components 620 may include, but are not limited to, one or more polarizers, one or more filters, one or more beam splitters, one or more diffusers, one or more homogenizers, one or more apodizers, one or more beam shapers, or one or more lenses.

In embodiments, the set of illumination optics 616 may utilize a first focusing element 622 to focus and/or direct the beam onto the sample 607 disposed on the sample stage 612. In embodiments, the set of collection optics 618 may include a second focusing element 626 to collect illumination from the sample 607.

In embodiments, the detector assembly 628 is configured to capture illumination emanating from the sample 607 through the set of collection optics 618. For example, the detector assembly 628 may receive illumination reflected or scattered (e.g., via specular reflection, diffuse reflection, and the like) from the sample 607. By way of another example, the detector assembly 628 may receive illumination generated by the sample 607 (e.g., luminescence associated with absorption of the beam, and the like). It is noted that detector assembly 628 may include any sensor and detector assembly known in the art. For example, the sensor may include, but is not limited to, CCD detector, a CMOS detector, a TDI detector, a PMT, an APD, and the like.

The set of collection optics 618 may further include any number of collection beam conditioning elements 630 to direct and/or modify illumination collected by the second focusing element 626 including, but not limited to, one or more lenses, one or more filters, one or more polarizers, or one or more phase plates.

The system 600 may be configured as any type of metrology tool known in the art such as, but not limited to, a spectroscopic ellipsometer with one or more angles of illumination, a spectroscopic ellipsometer for measuring Mueller matrix elements (e.g., using rotating compensators), a single-wavelength ellipsometer, an angle-resolved ellipsometer (e.g., a beam-profile ellipsometer), a spectroscopic reflectometer, a single-wavelength reflectometer, an angle-resolved reflectometer (e.g., a beam-profile reflectometer), an imaging system, a pupil imaging system, a spectral imaging system, or a scatterometer.

A description of an inspection/metrology tools suitable for implementation in the various embodiments of the present disclosure are provided in U.S. Pat. No. 7,957,066, entitled "Split Field Inspection System Using Small Catadioptric Objectives," issued on Jun. 7, 2011; U.S. Pat. No. 7,345,825, entitled "Beam Delivery System for Laser Dark-Field Illumination in a Catadioptric Optical System," issued on Mar. 18, 2018; U.S. Pat. No. 5,999,310, entitled "Ultra-broadband UV Microscope Imaging System with Wide Range Zoom Capability," issued on Dec. 7, 1999; U.S. Pat. No. 7,525,649, entitled "Surface Inspection System Using Laser Line Illumination with Two Dimensional Imaging," issued on Apr. 28, 2009; U.S. Pat. No. 9,228,943, entitled "Dynamically Adjustable Semiconductor Metrology System," issued on Jan. 5, 2016; U.S. Pat. No. 5,608,526, entitled "Focused Beam Spectroscopic Ellipsometry Method and System, by Piwonka-Corle et al., issued on Mar. 4, 1997; and U.S. Pat. No. 6,297,880, entitled "Apparatus for Analyzing Multi-Layer Thin Film Stacks on Semiconductors," issued on Oct. 2, 2001, which are each incorporated herein by reference in their entirety.

Figure 7:
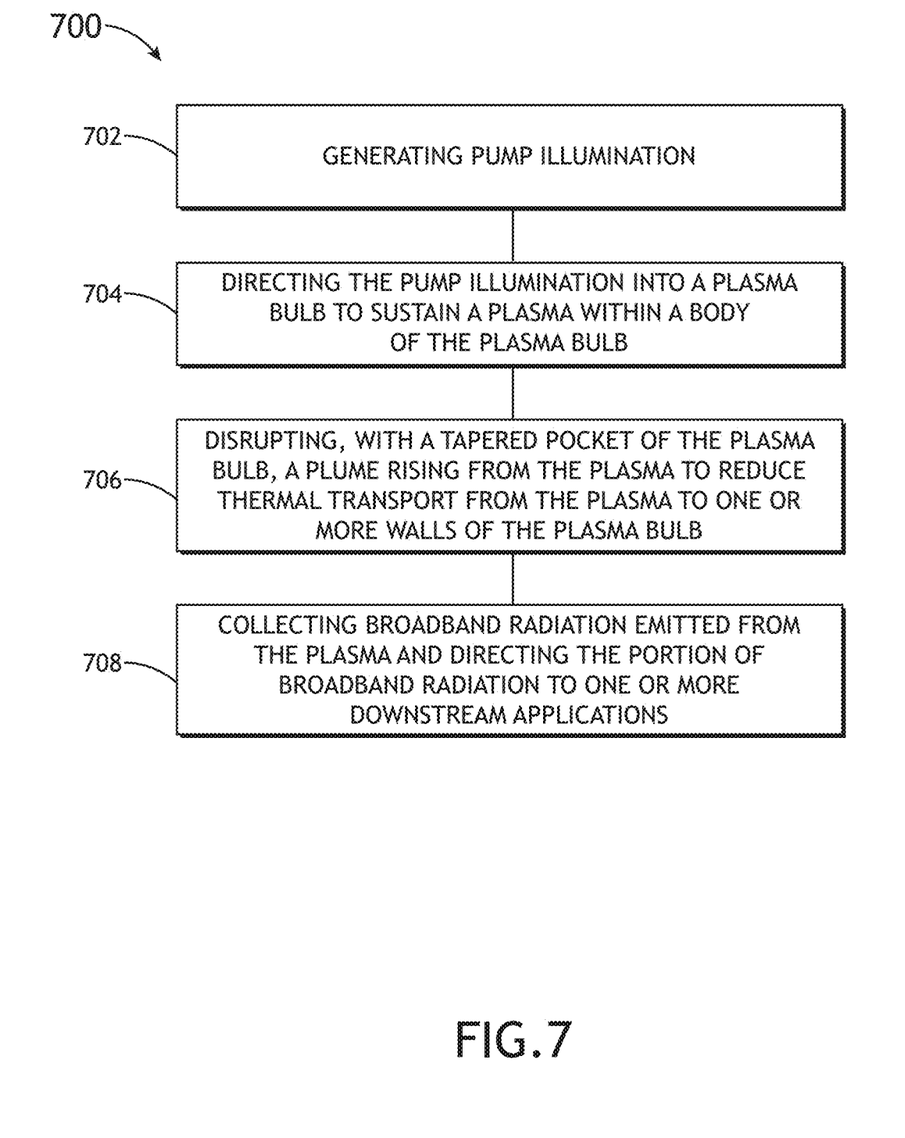
FIG. 7 illustrates a flow diagram depicting a method of reducing thermal transport between a plasma and a plasma bulb in a laser-sustained plasma source, in accordance with one or more embodiments of the present disclosure.

FIG. 7 illustrates a flow diagram depicting a method 700 of reducing thermal transport between a plasma and a plasma bulb in a laser-sustained plasma source, in accordance with one or more embodiments of the present disclosure. In step 702, pump illumination is generated. In step 704, a portion of the pump illumination is directed into a plasma bulb to sustain a plasma within a body of the plasma bulb. In step 706, a portion of a plume rising from the plasma is disrupted, with a conical pocket of the plasma bulb, to reduce thermal transport from the plasma to one or more walls of the plasma bulb. In step 708, a portion of broadband radiation emitted from the plasma is collected and then to one or more downstream applications.

It is further contemplated that each of the embodiments of the method described above may include any other step(s) of any other method(s) described herein. In addition, each of the embodiments of the method described above may be performed by any of the systems described herein One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A plasma lamp comprising:
    a plasma bulb configured to contain a gas and generate a plasma within the plasma bulb, the plasma bulb formed from a material at least partially transparent to illumination from a pump laser and at least a portion of broadband radiation emitted by the plasma,
    wherein the plasma bulb comprises a conical pocket, wherein the conical pocket includes at least one of a converging section or a diverging conical section and is configured to disrupt a plume rising from the plasma.
2. The plasma lamp of claim 1, wherein the conical pocket inhibits thermal transport from the plasma to one or more walls of the plasma bulb.
3. The plasma lamp of claim 1, wherein the plasma bulb comprises a body.
4. The plasma lamp of claim 3, wherein the conical pocket is integrated with the body to disrupt the plume rising from the plasma prior to impingement of the plasma onto a top portion of the plasma bulb.
5. The plasma lamp of claim 3, wherein the body comprises an ellipsoidal section.
6. The plasma lamp of claim 1, wherein the conical section has a non-uniform shape.
7. The plasma lamp of claim 1, wherein a wall of the conical section is non-uniform.
8. The plasma lamp of claim 1, wherein the conical section comprises a straight section integrated with a narrowing conical section.
9. The plasma lamp of claim 1, wherein the conical section comprises a widening conical section integrated with a narrowing conical section.
10. The plasma lamp of claim 1, further comprising one or more metal rods.
11. The plasma lamp of claim 1, wherein the bulb is electrodeless.
12. The plasma lamp of claim 1, further comprising:
    one or more electrodes disposed within the bulb, the one or more electrodes configured to initiate plasma generation within the bulb.
13. The plasma lamp of claim 1, wherein the gas contained within the gas containment structure comprises at least one Xe, Ar, Ne, Kr, He $N_2$, $H_2O$, $O_2$, $H_2$, $D_2$, $F_2$, $CF_6$, or a mixture of two or more Xe, Ar, Ne, Kr, He, $N_2$, $H_2O$, $O_2$, $H_2$, $D_2$, $F_2$, or $CF_6$.
14. The plasma lamp of claim 1, wherein the glass material of the plasma bulb comprises a fused silica glass material.
15. A plasma lamp comprising:
    a plasma bulb configured to contain a gas and generate a plasma within the plasma bulb, the plasma bulb formed from a material at least partially transparent to illumination from a pump laser and at least a portion of broadband radiation emitted by the plasma,
    wherein the plasma bulb comprises a multi-step tapered pocket, wherein the multi-step tapered pocket includes a series of narrowing stepped sections and is configured to disrupt a plume rising from the plasma.
16. A laser-sustained plasma light source comprising:
    a plasma bulb configured to contain a volume of gas;
    a laser pump source configured to generate an optical pump to sustain a plasma within the plasma bulb; and
    a light collector element configured to collect at least a portion of broadband light emitted from the plasma, wherein the plasma bulb is formed from a material at least partially transparent to illumination from a pump laser and at least a portion of the broadband radiation emitted by the plasma, wherein the plasma bulb comprises a conical pocket, wherein the conical pocket includes at least one of a converging section or a diverging conical section and is configured to disrupt a plume rising from the plasma.
17. A characterization system comprising:
    a laser-sustained light source comprising:
        a plasma bulb configured to contain a volume of gas;
        a laser pump source configured to generate an optical pump to sustain a plasma within the plasma bulb;
        a light collector element configured to collect at least a portion of broadband light emitted from the plasma, wherein the plasma bulb is formed from a material at least partially transparent to illumination from a pump laser and at least a portion of the broadband radiation emitted by the plasma, wherein the plasma bulb comprises a conical pocket, wherein the conical pocket includes at least one of a converging section or a diverging conical section and is configured to disrupt a plume rising from the plasma;
    a set of illumination optics configured to direct broadband light from the laser-sustained light source to one or more samples;
    a set of collection optics configured to collect light emanating from the one or more samples; and
    a detector assembly.
18. A method comprising:
    generating pump illumination;

directing a portion of the pump illumination into a plasma bulb to sustain a plasma within a body of the plasma bulb;

disrupting, with a conical pocket, wherein the conical pocket includes at least one of a converging section or a diverging conical section, a portion of a plume rising from the plasma to reduce thermal transport from the plasma to one or more walls of the plasma bulb; and collecting a portion of broadband light emitted from the plasma and directing the portion of broadband light to one or more downstream applications.

\* \* \* \* \*